UNITED STATES PATENT OFFICE.

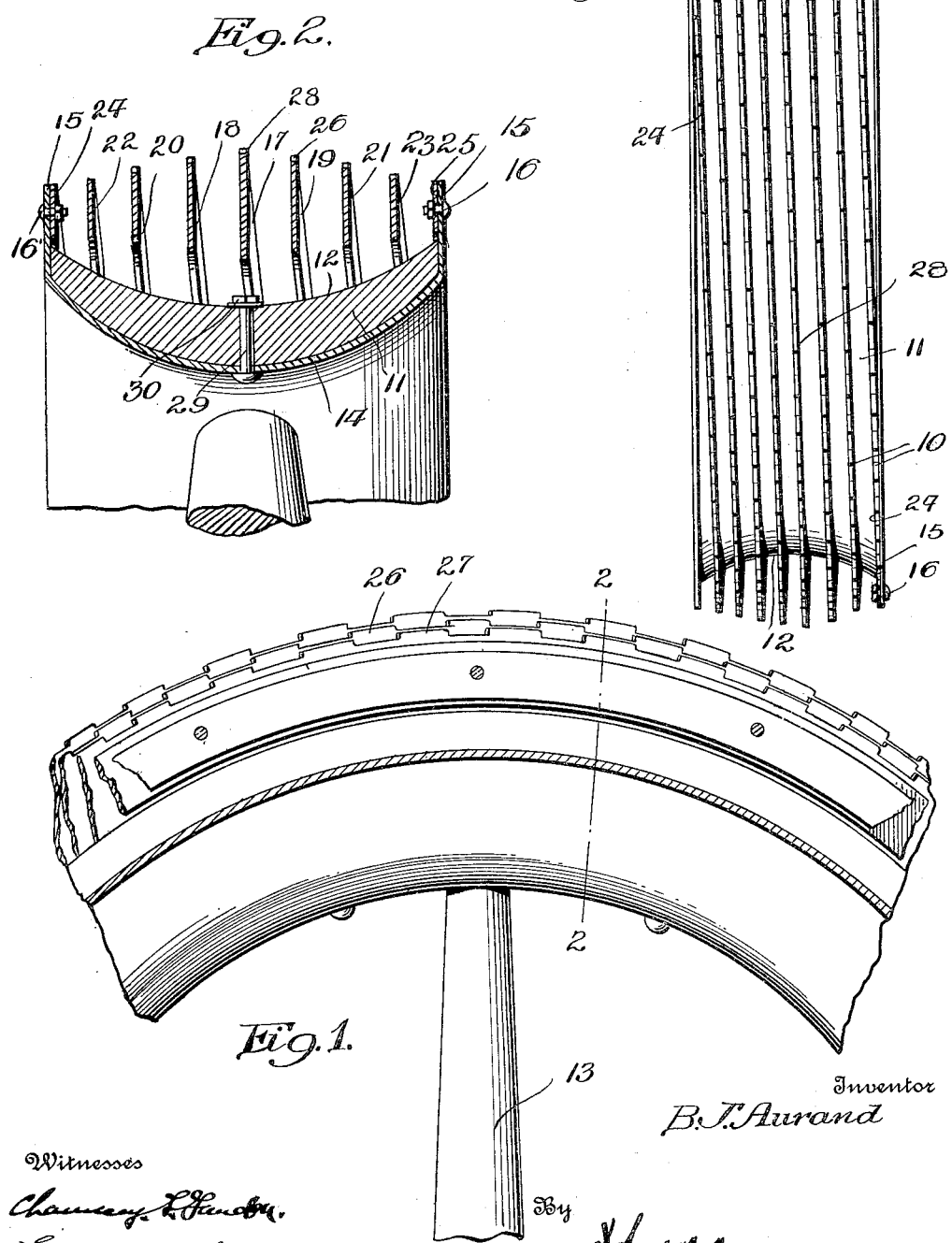

BALERA J. AURAND, OF MOUNT GILEAD, OHIO, ASSIGNOR OF ONE-HALF TO HORATIO G. PETERS, OF MOUNT GILEAD, OHIO.

VEHICLE-WHEEL.

1,132,148. Specification of Letters Patent. Patented Mar. 16, 1915.

Application filed April 24, 1914. Serial No. 834,263.

*To all whom it may concern:*

Be it known that I, BALERA J. AURAND, citizen of the United States, residing at Mount Gilead, in the county of Morrow and State of Ohio, have invented certain new and useful Improvements in Vehicle-Wheels, of which the following is a specification.

My invention relates to new and useful improvements in metallic tires for vehicle wheels, and as its principal object aims to provide a tire which is constructed from a continuous length or strip of sheet metal bent to produce a number of concentric annular convolutions which are spaced apart and mounted on the rim of the wheel in the nature of circumferentially extending fins or vanes.

A further object of my invention is to provide a metallic tire which may be cheaply manufactured, will be durable and efficient in its action, and may be readily and quickly applied to any standard form of wheel felly.

The above and additional objects are accomplished by such means as are illustrated in the accompanying drawings, described in the following specification, and then more particularly pointed out in the claim, which is appended hereto and forms part of this application.

With reference to the drawings, wherein there has been illustrated the preferred embodiment of this invention as it is reduced to practice, and throughout the several views of which similar reference numerals designate corresponding parts, Figure 1 is a side elevation of a portion of a wheel equipped with a tire constructed in accordance with my invention; Fig. 2 is a section on the line 2—2 of Fig. 1; and Fig. 3 is an edge view of a wheel equipped with a tire constructed in accordance with my invention.

In the embodiment of my invention illustrated in the accompanying drawings, I have applied the tire, designated as an entirety by the numeral 10, to a wheel having a felly 11 which is concavo-convex in cross section and is arranged with its concave face 12 outermost to provide a channel for the reception of the tire.

The felly 11 is preferably constructed of wood in the usual manner, although, if so desired, any other material may be employed without departing in any way from the spirit of my invention. The felly 11 is mounted in the customary manner on spokes, indicated at 13, and is equipped with a tire holding plate 14. This tire holding plate 14 is preferably constructed of sheet metal and is annular in shape, being pressed or otherwise made to conform to the inner face of the felly. The edge portions of the tire holding plate or annulus 14 are bent around the edges of the felly 11 and directed outwardly to form circumferential retaining flanges, indicated at 15. To these retaining flanges 15 are bolted the terminals of the metallic strip from which the tire is formed. These tire holding bolts are indicated at 16. It is desirable to explain in this connection that although bolts are the preferred securing means employed, rivets or any other suitable fastening devices may be used if found desirable.

The tire, heretofore designated as an entirety by the numeral 10, is, as previously stated, formed from a continuous strip or length of resilient sheet metal, tempered steel being preferably used. The substantially flat strip of metal or band from which the tire is formed is relatively wide at its center portion, and tapers gradually and uniformly toward each terminal so that, when the strip is shaped to produce the tire, the centrally arranged convolution, indicated at 17, will be of greater width and will, consequently, project from the felly a greater distance than the remaining convolutions. The two convolutions 18 and 19, which are adjacent the central convolution 17 and are arranged on opposite sides thereof, are, of course, of less width than the member 17. The next pair of tire convolutions, indicated at 20 and 21, are of less width than the members 18 and 19, while the succeeding pair of convolutions, indicated at 22 and 23, are of still less width. The outermost convolutions or terminal portions of the tire, indicated at 24 and 25, are of less width than any of the other convolutions, and are, as previously set forth, secured by bolts 16 to the flanges 15 of the tire holding plate 14.

From the foregoing description, and upon reference particularly to Fig. 2, it will be apparent that the tire is arcuate in cross section, and that its center portion will engage with the roadbed except when the road-bed is soft and the central convolutions sink in, permitting the outermost convolutions to engage. It will also be apparent that because of the peculiar construction of the tire and the fact that the various convolutions form in effect circumferential vanes or fins any skidding of the wheels will be prevented.

In order to prevent the slipping of the wheel, the five center convolutions 17, 18, 19, 20, and 21 of the tire have been formed with a plurality of spaced anti-skid studs. The studs or projections 26 and 27 respectively of the convolutions 19 and 21 and 18 and 20 are arranged in staggered relation to each other and to the anti-skid studs 28 of the central convolution 17.

A number of bolts are employed, as indicated at 29, for properly securing the tire holding plate 14 to the inner face of the wheel felly 11. These bolts are held against displacement by the usual nuts, indicated at 30. In their normal position, the five central convolutions 17, 18, 19, 20 and 21 are arranged in spaced relation to the face 12 of the felly, and it is, therefore, apparent that they may, when the wheel strikes a rock or other foreign object in the roadbed, yield by moving inwardly toward the felly, thus absorbing many of the shocks to which the vehicle would otherwise be subjected.

From the foregoing description, and upon reference to Fig. 2 particularly, it will be now apparent that the tire consists in a resilient strip of sheet metal which is wound about the periphery or outer face of the wheel felly in the nature of a helix. In this connection, attention is called to the fact that the concave face of the felly gradually approaches the inner edges of the convolutions of the tire from a point substantially medially thereof while the said convolutions are correspondingly decreased in width upon each side of the central convolution. By this arrangement, it will be observed that when the tire is supporting a load, and the several convolutions of the tire are depressed, the outer edges of the said convolutions will be so supported by the concave face of the felly as to be in alinement; that is, the outer edges of the said convolutions will be supported in alinement at the point where the tire contacts with the road bed and consequently, weight will be equally distributed among all of the convolutions. Obviously, this is an important feature of advantage.

In reduction to practice, it has been found that the form of this invention illustrated in the drawings, and referred to in the above description as the preferred embodiment, is the most efficient and practical; yet realizing that the conditions concurrent with the adoption of this invention will necessarily vary, it is desirable to emphasize the fact that various minor changes in details of construction, proportion and arrangement of parts may be resorted to, when required, without sacrificing any of the advantages of this invention, as defined in the appended claim.

Having thus described the invention, what is claimed as new is:—

A vehicle wheel including a felly having a concave outer face, a tire holding member projecting radially of the felly at opposite sides thereof, and a tire operatively secured to the member, said tire consisting of a continuous strip of metal gradually decreasing in width toward its ends from a point medially thereof, the said strip being wound helically about the felly and confined by said member with the concave face of the felly gradually approaching the inner edges of the convolutions of the tire from a point medially thereof.

In testimony whereof I affix my signature in presence of two witnesses.

BALERA J. AURAND. [L. S.]

Witnesses:
H. G. PETERS,
J. C. WILLIAMSON.

Copies of this patent may be obtained for five cents each, by addressing the "Commissioner of Patents, Washington, D. C."